E. P. DAWSON.
GAS ENGINE.
APPLICATION FILED MAY 9, 1907.

1,056,510.

Patented Mar. 18, 1913.
4 SHEETS—SHEET 1.

Witnesses:
Max B. A. Doring
Stella A. Neumann

Inventor
Edward P. Dawson,
By his Attorneys
Prindle and Williamson.

E. P. DAWSON.
GAS ENGINE.
APPLICATION FILED MAY 9, 1907.

1,056,510.

Patented Mar. 18, 1913.

4 SHEETS—SHEET 3.

Witnesses:

Inventor
Edward P. Dawson,
By his Attorneys
Prindle and Williamson.

E. P. DAWSON.
GAS ENGINE.
APPLICATION FILED MAY 9, 1907.
1,056,510.
Patented Mar. 18, 1913.
4 SHEETS—SHEET 4.
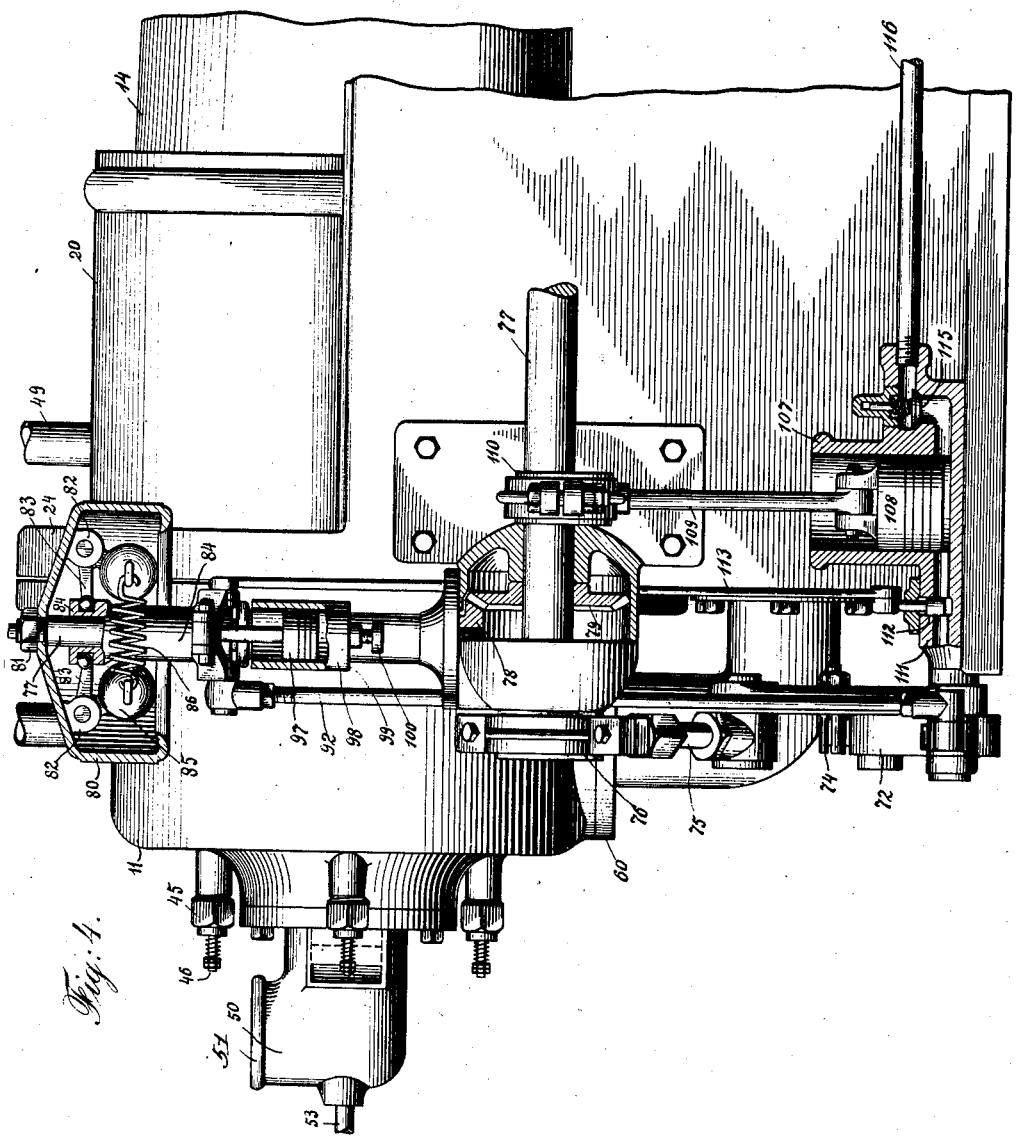
Witnesses:
Max B. A. Doring
Stella C. Neumann
Inventor
Edward P. Dawson,
By his Attorneys
Prindle and Williamson,

UNITED STATES PATENT OFFICE.

EDWARD PYLE DAWSON, OF BUTTE, MONTANA.

GAS-ENGINE.

1,056,510.  Specification of Letters Patent.  Patented Mar. 18, 1913.

Application filed May 9, 1907. Serial No. 372,810.

*To all whom it may concern:*

Be it known that I, EDWARD P. DAWSON, a resident of Butte, in the county of Silverbow, and in the State of Montana, have invented a certain new and useful Improvement in Gas-Engines, and do hereby declare that the following is a full, clear, and exact description thereof, reference being had to the accompanying drawings, in which—

Figure 1:
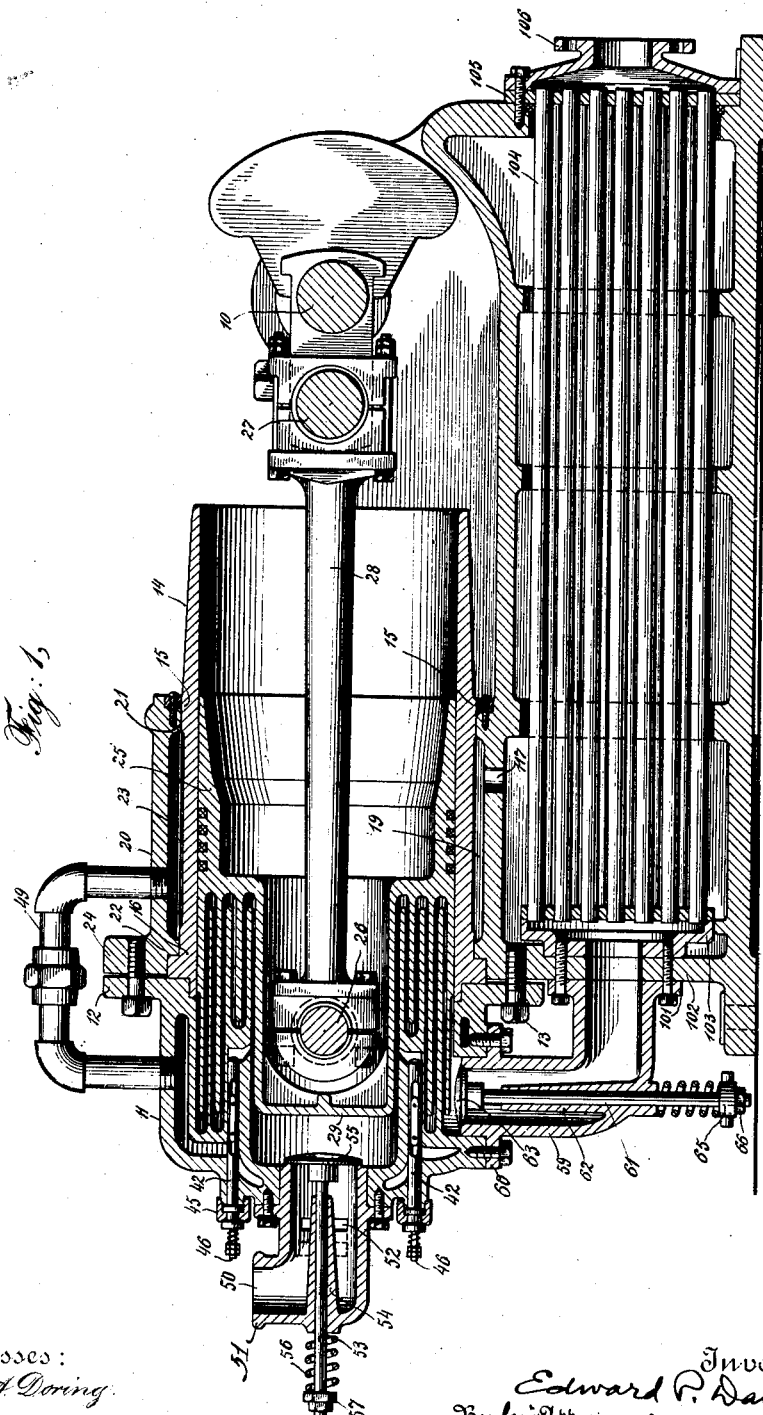
Figure 2:
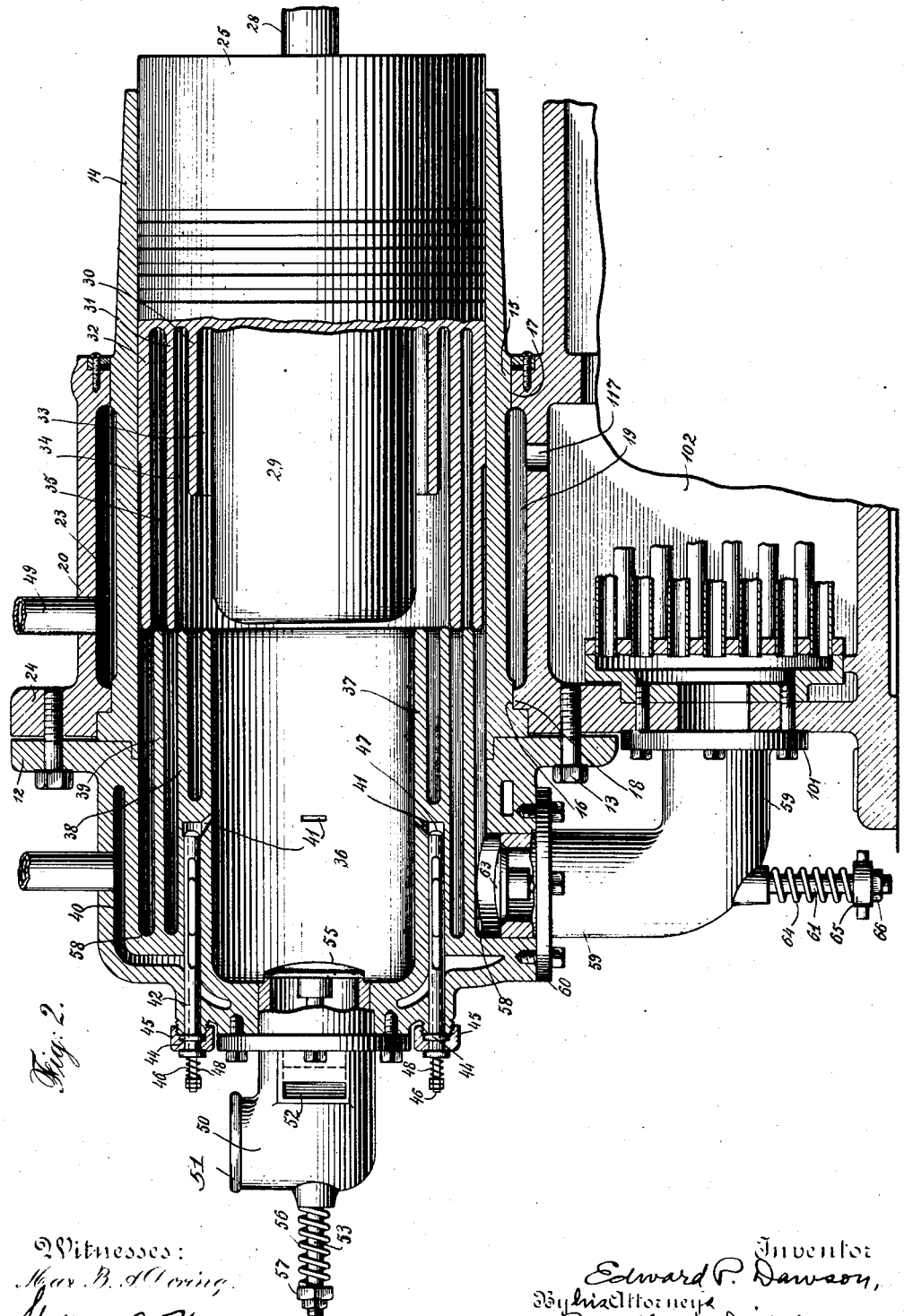
Figure 3:
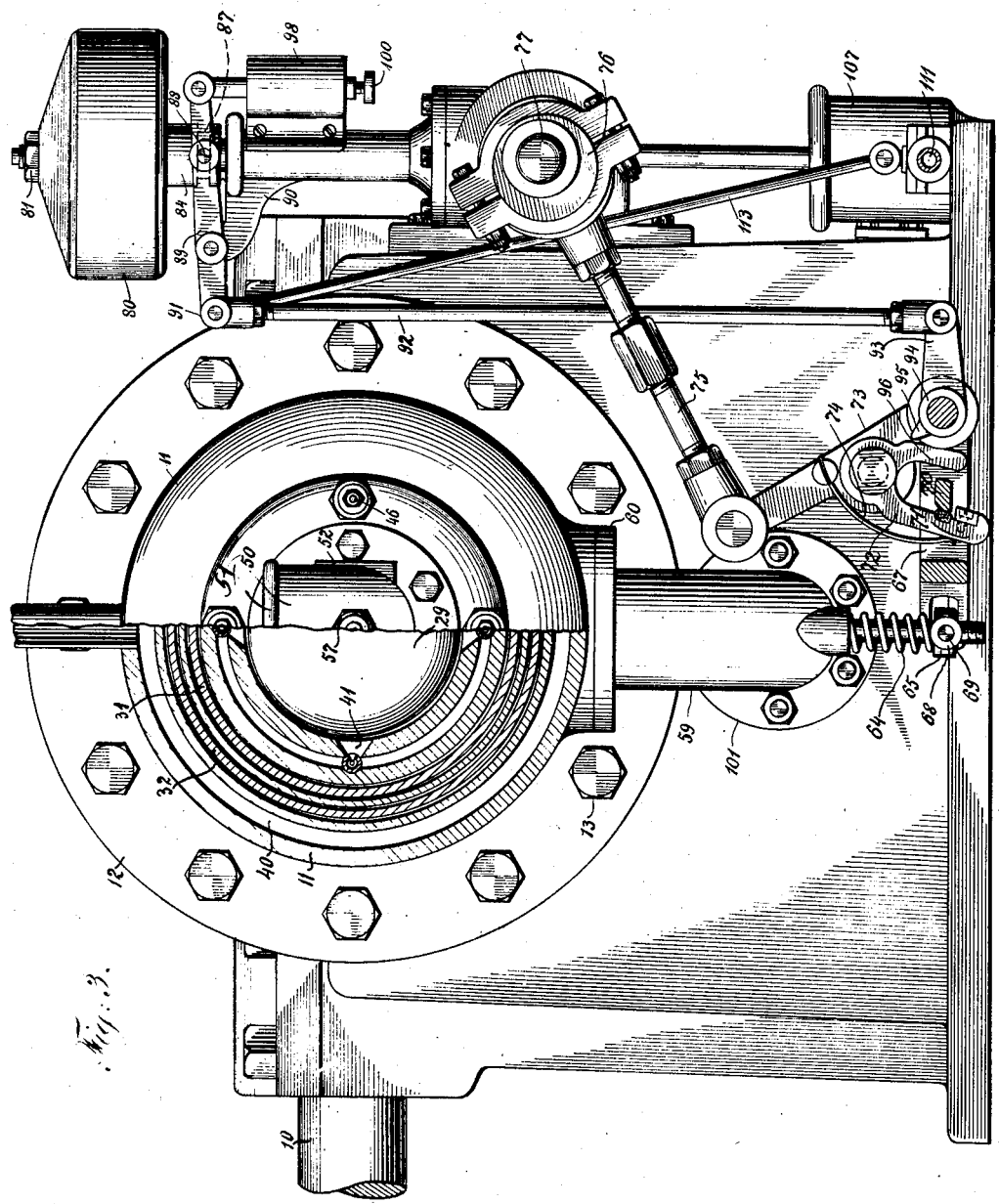

Figure 1 is a longitudinal, sectional view of a gas engine embodying my invention, the piston being shown at the rearward end of its stroke; Fig. 2 is a similar view of the cylinder and piston, the piston being shown at the forward end of its stroke; Fig. 3 is an end elevation, partly in section, of Fig. 1 on an enlarged scale; and Fig. 4 is a side elevation, partly in section, of the governor, pump and connected parts.

The object of my invention has been to provide a gas engine of increased efficiency, and to such ends my invention consists in the gas engine hereinafter specified.

In carrying my invention into practice, I provide a frame having bearings for a crank-shaft 10. A cylinder is also mounted on the frame, said cylinder including a head 11 having a flange 12, the lower half of which is secured to the frame, as by bolts 13. The cylinder-body 14 is provided with annular ribs 15 and 16, which rest upon corresponding annular seats 17 and 18 formed in the frame, so that a space 19 is formed between the cylinder and the frame about the lower half of the cylinder-body. The upper half of the cylinder body is covered by a shell 20 having annular rings 21 and 22 corresponding to the ribs 15 and 16, so that an annular space 23 is formed between the said shell and cylinder-body. The shell 20 is also provided with a flange 24 to which is bolted the flange 12 of the cylinder-head, and the cylinder body is rabbeted into the cylinder-head, the frame, and the shell 20. The spaces 19 and 23 together form an annular water-jacket completely surrounding the cylinder. Within the cylinder is mounted a piston 25, whose wrist-pin 26 is connected to the crank 27 by a connecting-rod 28. The piston proper is provided with a central, cylindrical projection 29 which is surrounded by a series of annular regenerator-rings 30, 31 and 32, which are separated so as to form spaces 33, 34 and 35. The projection 29 on the piston is adapted to be received in the combustion chamber 36 of the cylinder. The forward portion of said combustion chamber is formed by an annular regenerator ring 37, which is adapted to be received in the space 33 during the rearward portion of the piston stroke. Concentric with and outside of the ring 37 are regenerator rings 38 and 39, which are properly positioned to be received respectively into the spaces 34 and 35. Obviously, a greater or less number of rings could be used. In the cylinder-head is formed a water-jacket 40, and slits or openings 41 permit the passage of water from the said water-jacket into the combustion chamber, the said slits being preferably formed at regular intervals around the wall of the combustion chamber, and being forwardly directed. If desired, the slits 41 may form a continuous annular slit around the combustion chamber. The passage of the fluid from the water-jacket 40 to the slits 41 is regulated by a series of valves, each valve consisting of a tube 42 extending from the slit 41 rearwardly through the cylinder-head, and each tube having slots or openings in its sides for the water to enter the tube from the water-jacket. Each tube is provided with a collar or shoulder 44 that rests against the outer surface of the cylinder-head, and the joint is packed by a sleeve-nut 45. A valve-rod 46 passes through each tube 42 and is provided with a head 47 that is normally drawn against the forward end of the tube by a spring 48 coiled about said rod, the tension of the said spring being suitably regulated by nuts.

It will be seen that when the pressure of the water on the under-side of the head 47 is greater than the tension of the spring, the head 47 will be lifted off the tube and the water will pass from the water-jacket into the slits 41. The valves prevent the escape of water until the required pressure has been reached, and they also prevent the return of the water under the pressure of the gases in the cylinder. A pipe 49, or other form of communication is provided between the water-jacket on the cylinder-body and the water-jacket 40. Gas enters the rear end of the combustion chamber through a pipe 50, or other convenient form of passage, and the pipe 50 is provided with a flange 51 by which it is bolted to the cylinder head. In the side of the pipe 50 are formed forwardly inclined openings 52 for the admission of air. The pipe 50 is provided with a valve consisting of a stem 53 that is mounted in a guide 54 formed in the pipe, the forward end of the stem being provided with a head 55 that covers the end of the pipe. A spring 56, coiled about the stem 53 between the pipe 50, and the nuts 57 holds the head 55 on its seat to prevent the entrance of the mixture of air and gas to the combustion chamber, except when there is a suction therein, or if the valve be mechanically operated, and to prevent the pressure in the combustion chamber forcing the gases back into the pipe 50. The annular space 58 between the outer regenerator ring 39 on the cylinder-head, and the shell of the cylinder head, communicates with an exhaust pipe 59 (that may be conveniently bolted to the cylinder-head by a flange 60), and an exhaust valve controls the entrance to such pipe. The exhaust valve also comprises a stem 61 mounted in a guide 62 formed on or attached to the pipe 59, and the upper end of said stem is provided with a head 63 which is seated in the upper end of the pipe 59, while the lower end of the stem is surrounded by a spring 64 which, re-acting against the guide 62 bears upon a collar 65 screwed on the said stem and secured by a lock-nut 66, so that the head 63 is held upon its seat by the said spring, except when the stem or valve-rod is mechanically raised.

The means for operating the exhaust valve are as follows: A lever 67 is pivoted on a pin carried by a bracket on the frame of the machine, and the said lever is provided with a forked end that is adapted to engage anti-friction rollers 68 carried by pins 69 on the collar 65 that is on the valve-stem. The lever 67 has a shoulder 70 formed as by a bar connecting the side bars of the lever. The shoulder 70 is adapted to be engaged by a shoulder 71 on a dog 72 that is pivoted to a lever 73 which is fulcrumed concentric (although not necessarily) to the lever 67. A spring 74 on the lever 73 tends to draw the shoulder 71 toward the shoulder 70. The lever 73 is pivoted to an eccentric rod 75, (the latter being preferably adjustable in length) the strap of said eccentric rod engaging an eccentric 76 on a shaft 77 which is geared to the crank-shaft in the ordinary way, so as to rotate once for every two revolutions of the crank-shaft. The shaft 77 will hereafter be referred to as the "two to one shaft." It will thus be seen that every two revolutions of the crank-shaft, if nothing prevents, the shoulder 71 on the dog 72 will engage the shoulder 70 on the lever 67 and raise the exhaust valve off of its seat.

In order to regulate the speed of the engine, the exhaust is controlled by a governor as follows:—A governor is mounted on the upper end of a shaft 77', that is driven by a beveled gear and pinion 78 and 79 from the "two to one shaft". The governor comprises a shell 80 that is secured upon the upper end of the shaft by a nut 81, the shell having on its under side opposite pairs of ears 82 between which are pivoted bell crank levers having their arms 83 engaged in a groove formed in a collar 84 on the governor shaft, and having weights 85 secured upon the opposite arms, the opposite weights being connected together by springs 86. The springs thus normally tend to hold the collar 84 in an elevated position, and the centrifugal force of the weights 85 tends to depress the said collar. On its lower end the collar is provided with a groove 87 that is engaged by pins 88 on a double lever 89, the latter being pivoted on a bracket 90 formed on the frame. One arm of the double lever carries a pin 91 that is connected by a rod 92 with an arm 93 on a sleeve 94 that is fulcrumed on the same pin as the lever 67. The sleeve 94 has a lug 95 that is adapted, when the weights of the governor are thrown apart, to bear against a finger 96 on the dog 72, and thus to hold the shoulder 71 away from the shoulder 70, so as to prevent engagement. In order to prevent too sudden action of the governor, the end of the lever 89 opposite to that carrying the pin 91, is connected with the piston 97 of a dash-pot 98, the admission of air to the dash-pot through a wall 99 being governed by a thumb-screw 100. The exhaust pipe 59 is secured by a flange 101 to a wall of a heater-casing 102. Within the heater-casing is a head 103 that is bolted over the opening for the pipe 59, and flues 104 connect the said head with a plate 105 that is bolted to the opposite end of the heater-casing. A hood 106 conveys the gases which have passed through the flues to any desired point.

To cause a circulation of water through the heater and through the water-jackets, a pump is driven from the "two to one shaft", said pump comprising a cylinder 107 containing a piston 108, the latter being connected by a rod 109 with an eccentric 110 on the "two to one shaft." The entrance 111 to the pump is controlled by a valve 112, the latter being operated by a rod 113 that is connected with a pin on the opposite arm of the lever 89. Thus the valve 112 is depressed more or less according to the speed of the engine, the higher the speed, the more the said valve being depressed. A check-valve 115 prevents the flow of water back through the pump. The exit 116 of the pump is connected with the crank-shaft end of the heater-casing, and the water thus flows from the cooler end of the heater to the warmer or cylinder end of the heater, and thence by means of an opening 117 enters the water-jacket formed by the spaces 19 and 23. From thence the water passes through the pipe 49 to the water-jacket 40, and enters the combustion chamber through the slits 41.

In the operation of the above described embodiment of my invention, assuming that the engine has just made its working stroke, and the exhaust valve has just opened: As the piston travels back, the cooler gases of the previous exhaust in the outer space between the regenerator rings, and the water vapor formed by the water that has entered through the slits 41, are first exhausted, while the hot gases of the combustion chamber begin to spread and flow through the sinuous passages between the regenerator rings, until the closing of the exhaust valve by the action of the governor in moving the sleeve 94 causes the lug 95 to push the dog 96 until the shoulder 71 is disengaged from the shoulder 70. The exhaust gases that remain will thus be held in the cylinder and will be slightly compressed as the piston completes its back or exhaust stroke. These gases which are left, fill the spaces between the regenerator rings, and are there left by the rings opening out on the suction or second stroke of the piston, while the combustion chamber is filling with a new explosive mixture. As the piston returns on its third or compression stroke, the new mixture in the combustion chamber, and the gases left in the spaces between the regenerator rings from the previous exhaust, are compressed, but the fresh gas and the exhaust gases are not, as a whole, mixed together. When the piston has so far completed its compression stroke that its central projection 29 has covered the slits or openings 41, the pump begins to force the water past the valves controlling the slits 41. The water, owing to the presence of the central projection 29 of the piston, and owing to the fact that it is injected in a forward direction, is practically prevented from mixing with the fresh explosive mixture, and the injection of the water is completed just as the explosion takes place, driving the piston forward on the fourth or working stroke. As the water has been gradually raised to a fairly high temperature by its passage successively through the heater, the first water-jacket, and the second water-jacket, it readily expands into steam or vapor with the heat which it receives from the regenerator rings, thus helping to do work in driving the engine. The water, when it enters the combustion chamber, is not hot enough to raise the new explosive mixture above the temperature which it acquires by the compression, but the water is at a lower temperature and cools the gases, allowing a high compression to be used, without danger of pre-ignition.

In the ordinary gas engine, the fresh mixture of explosives has access to all parts of the chamber, and it is drawn in through the inlet valve for the complete stroke of the piston, and then compressed at one end of the cylinder and exploded, thereby giving a momentary high explosive wave, which carries the piston to its out or working stroke. If the explosion is perfect, the gases at the completion of the stroke will still exert a considerable pressure, and on exhaust taking place, will carry away and waste a large amount of heat. All of the heat carried away by the water jacket will, of course, be wasted. In my engine, however, a large proportion of the heat of the exhaust is saved, and a considerable proportion of the heat of the water jacket is also saved. It will be observed that the gases travel through my engine in a well defined path, and do not merely enter and leave the cylinder. They enter the combustion chamber and are there confined until the explosion takes place. They are confined partly by the central projection 29 of the piston, and partly by the presence of steam formed by water injected through the slits 41, which separates the fresh mixture from the exhaust gases which are retained between the regenerator rings. When the gases have been exploded, they can only reach the exhaust by passing between the regenerator rings, and a portion of the exhaust gases is confined in the spaces between said rings, so that they are compelled to give up a large part of their waste heat. After leaving the cylinder, the exhaust gases pass through the water heater, where still more heat is given up. The water takes this heat and conveys it back to the cylinder by way of the water jackets and the slits 41. In each water jacket the water receives more heat, and while the water is advantageously heated, it keeps the temperature down around the combustion chamber, and, therefore, makes possible a higher compression of the fresh mixture, without danger of explosion. When the water enters the cylinder it does not interfere with the explosive mixture, because by the central projection 29 of the piston, and the forward inclination of the slits 41, it is not injected into the explosive mixture, and yet the heat in the water is sufficient so that the explosion readily converts the water into steam to add its expansive force to that of the explosive mixture. The governor assures that the desired amount of previously exploded mixture shall be retained between the regenerator rings while the combustion chamber is filling with the new mixture.

It will be observed that my combustion chamber is free from all protruding ridges or pockets, so that heat from the exploded gases is avoidably not retained, and fresh gases are received into a chamber of comparatively low temperature.

While I have illustrated one embodiment of my invention, and that the embodiment which I believe to be the most perfect one, it is to be understood that the principles above illustrated are capable of variation, and I desire not to be limited beyond the requirements of the prior art, and the necessary intendment of my claims.

It is to be understood that the above described invention is capable of use either with gas, oil or vapor.

Having thus described my invention, I claim—

1. A gas engine having a combustion chamber, a regenerator in communication therewith to receive the exhaust gases connected thereto so as to return some of the heat of the exhaust gases to the engine, means for supplying the components of the explosive mixture only at the end of the combustion chamber farthest removed from the point where the regenerator communicates with the combustion chamber, and an exhaust valve at the end of the regenerator farthest removed from the point where the combustion chamber communicates with the regenerator.

2. In a gas engine, the combination of a cylinder-body having a water-jacket surrounding the same, a cylinder-head having a water-jacket surrounding the latter, means of communication between said water-jackets, a central combustion chamber formed in said cylinder-head, a regenerator comprising regenerator rings surrounding said combustion chamber, openings affording communication between the water-jacket of the cylinder-head and said combustion chamber, a piston having a central projection adapted to practically fill said combustion chamber, said regenerator also having regenerator rings on said piston adapted to intermesh with said first-mentioned rings, means for admitting an explosive mixture to said combustion chamber, means for exhausting gases outside of said regenerator rings, and means for forcing water into said first-mentioned water-jacket.

3. In a gas engine, the combination of a cylinder-body having a water-jacket surrounding the same, a cylinder-head having a water-jacket surrounding the latter, a regenerator located so as to receive exhaust gases from the cylinder, said regenerator having a number of regenerator rings, means of communication between said water-jackets, a central combustion chamber formed in said cylinder-head, openings affording communication between the water-jacket of the cylinder-head and said combustion chamber, a piston having a central projection adapted to practically fill said combustion chamber, said regenerator also having regenerator rings on said piston adapted to intermesh with said first-mentioned rings, means for exhausting gases outside of said regenerator rings, means for forcing water into said first mentioned water-jacket, and valves adapted to control the escape of water into the combustion chamber.

4. In a gas engine, the combination of a cylinder-body having a water-jacket surrounding the same, a cylinder-head having a water-jacket surrounding the latter, a regenerator located so as to receive exhaust gases from the cylinder, said regenerator having a number of regenerator rings, means of communication between said water-jackets, a central combustion chamber formed in said cylinder-head, openings affording communication between the water-jacket of the cylinder-head and said combustion chamber, a piston having a central projection adapted to practically fill said combustion chamber, said regenerator also having regenerator rings on said piston adapted to intermesh with said first-mentioned rings, means for exhausting gases outside of said regenerator rings, valves adapted to control the escape of water into the combustion chamber, a water-heater through which the exhaust passes, a connection between said water-heater and said first-mentioned water-jacket, and means for forcing water into said heater.

5. In a gas engine, the combination of a cylinder-body having a water-jacket surrounding the same, a cylinder-head having a water-jacket surrounding the latter, a regenerator located so as to receive exhaust gases from the cylinder, said regenerator having a number of regenerator rings, means of communication between said water-jackets, a central combustion chamber formed in said cylinder-head, openings affording communication between the water-jacket of the cylinder-head and said combustion chamber, a piston having a central projection adapted to practically fill said combustion chamber, said regenerator having regenerator rings on said piston adapted to intermesh with said first-mentioned rings, means for exhausting gases outside of said regenerator rings, valves adapted to control the escape of water into the combustion chamber, a water-heater through which the exhaust passes, a connection between said water-heater and said first-mentioned water-jacket, a governor, and connections thereon for controlling the exhaust and for controlling the admission of water to the combustion chamber.

6. A gas engine having a combustion chamber, a regenerator connected to said engine and having a regenerator chamber in communication therewith to receive the exhaust gases and connected thereto so as to return some of the heat of the exhaust gases to the engine, means for admitting an explosive mixture to said combustion chamber, and means for forcing water into the space where said combustion chamber and said regenerator chamber join each other.

7. In a gas engine, the combination of a combustion chamber, a piston adapted to reciprocate in said combustion chamber, water-admitting openings in the cylindrical walls of the said chamber and adapted to be overlaid by said piston, a regenerator chamber in communication with the outlet end of said chamber to receive the exhaust gases and connected thereto so as to return some of the heat of the exhaust gases to the engine, and means for forcing water through said openings after they have been overlaid but not closed by said piston.

8. In a gas engine, the combination of a combustion chamber, a piston adapted to reciprocate in said combustion chamber, water-admitting openings in the cylindrical walls of the said chamber and adapted to be overlaid by the piston, a regenerator chamber in communication with the outlet end of said combustion chamber for returning some of the heat of the exhaust gases to the engine, means for forcing water through said openings after they have been covered by said piston, and means for controlling the escape of gases from said regenerator chamber.

9. In a gas engine, the combination of a cylinder having a cylinder head and a central combustion chamber, a valve for admitting the explosive mixture to the central portion of said chamber, a regenerator having regenerator rings surrounding said chamber and spaced apart, a piston having a projection adapted to enter said combustion chamber, said regenerator also having regenerator rings on the piston adapted to intermesh with said first-mentioned rings, a water heater, a passage leading the exhaust gases into the same an exhaust valve controlling said passage, a pump adapted to force water through said water-heater, a water-jacket surrounding the body of the engine-cylinder and communicating with said water-heater, a water-jacket surrounding the cylinder-head and communicating with said first-mentioned jacket, openings affording communication between said last-mentioned jacket and the combustion chamber at a point removed from the compression end of said chamber, valves controlling the escape of water into the combustion chamber, a valve controlling the water pumped by said pump, and a governor controlling both said exhaust valve and said water-valve.

In testimony that I claim the foregoing I have hereunto set my hand.

EDWARD PYLE DAWSON.

Witnesses:
 ALEX. J. STEWART,
 J. HARRY POLGLOSE.